(12) United States Patent
Edlinger et al.

(10) Patent No.: US 6,476,972 B2
(45) Date of Patent: Nov. 5, 2002

(54) LIGHT SPLITTER AND OPTICAL TRANSMITTER CONFIGURATION WITH A LIGHT SPLITTER

(75) Inventors: Johannes Edlinger, Frastanz (AT); Claus Heine, Chur (CH)

(73) Assignee: Unaxis Balzers AG, Furstentum ( * ) Notice: Subject to any disclaimer, the term of this patent is extended or adjusted under 35 U.S.C. 154(b) by 0 days.

(21) Appl. No.: 09/933,205

(22) Filed: Aug. 20, 2001

(65) Prior Publication Data

US 2002/0126260 A1 Sep. 12, 2002

Related U.S. Application Data

(62) Division of application No. 09/267,475, filed on Mar. 11, 1999, now Pat. No. 6,288,844.

(30) Foreign Application Priority Data

Feb. 4, 1999 (CH) .................................................. 207/99

(51) Int. Cl.$^7$ .......................... G02B 27/14; G02B 27/12
(52) U.S. Cl. ....................................... 359/634; 359/639
(58) Field of Search ................................. 359/618, 634, 359/636, 638, 639, 640, 649; 483/336, 337, 338, 339; 353/20, 31, 35

(56) References Cited

U.S. PATENT DOCUMENTS 5,625,491 A  *  4/1997  Von Gunten et al. ........ 359/487
6,295,173 B1 *  9/2001  Hein ........................... 359/833

* cited by examiner

*Primary Examiner*—Georgia Epps
*Assistant Examiner*—Saeedh H Seyrafi
(74) *Attorney, Agent, or Firm*—Notaro & Michalos P.C.

(57) ABSTRACT

Method for manufacturing a selective light splitter and recombining device that divides white light into red, green and blue light and recombines red, green and blue light independently of polarization, provides two coating systems, each reflecting and transmitting color-selectivity. A transparent base body is embedded in or is on the coating systems and at least one of the coating systems has a layer of a material with lower refractive index and at least one of a material with higher refractive index. The lower refractive index is selected so that $1.7 \leq N_{LS} \leq 2.1$ and the refractive index of the transparent base body is selected so that $1.52 \geq N_K \geq 1$. The method also includes determining an emergent face for the red, green and blue light, and tilting one emergent face such that it forms an angle p deviating from zero by more than is caused by fabrication tolerances for which $\phi \leq 5°$.

41 Claims, 11 Drawing Sheets

LIGHT SPLITTER AND OPTICAL TRANSMITTER CONFIGURATION WITH A LIGHT SPLITTER

CROSS-REFERENCE TO RELATED APPLICATION

This is a divisional of U.S. application Ser. No. 09/267,475, filed Mar. 11, 1999, U.S. Pat. No. 6,288,844.

FIELD AND BACKGROUND OF THE INVENTION

The present invention relates to light splitters as well as optical transmitter configuration with a light splitter.

The present invention is based on problems such as were recognized when employing X-cubes and will be explained in the following. But the findings can, in principle, be transferred to optical light splitters which, as will yet be explained, are used in connection with light of different polarization. Regarding this topic, reference can be made to A. Thelen, "Nonpolarizing interference films inside a glass cube", Appl. Optics, Vol. 15, No. 12, December 1976.

For example, in DE 40 33 842 a cuboid optical structural component composed of single prisms with dichroic layers is referred to as a "dichroic prism". WO98/20383 by the sage applicant.

Definitions

The following definitions are used:

Light,
visible light: light with maximum energy in the spectral range 380 nm–720 nm
red light: light with maximum energy in the spectral range 580 nm–720 nm, in particular in the spectral range 600 nm–680 nm
green light: light with maximum energy in the spectral range 490 nm–605 nm, in particular in the spectral range 500 nm–600 nm
blue light: light with maximum energy in the spectral range 380 nm–510 nm, in particular in the spectral range 420 nm–500 nm
yellow light: light with maximum energy in the spectral range 475 nm–605 nm, in particular at 582±3 nm
white light: light with red, blue and green light components
transparent: negligible absorption in the spectral range 380 nm–720 nm
cube: spatial shape formed by identical rectangles pairwise opposing each other in parallel First, the fundamental effect of an X-cube will be explained with reference to FIG. 1. Optic light splitters of this type are employed primarily in projectors in order to separate white light into red, green and blue light or to recombine the latter into white light. According to FIG. 1, an X-cube comprises four single prisms 2a–2d. The prisms commonly comprise BK7 glass. In cross section they form right-angled isosceles triangles with an angle of 90°. The length of the hypotenuse is, for example, between 5 mm and 50 mm, preferably 20–30 mm. Between the two prism pairs 2a and 2b, on the one hand, and 2d and 2c, on the other, a spectrally selectively reflecting and transmitting coating system 5 is embedded, which largely reflects blue light but largely transmits green and red light.

Between the two prism pairs 2a and 2d, on the one hand, and 2b and 2c, on the other hand, a further spectrally selectively reflecting and transmitting coating system 7 is embedded which largely reflects red light, however largely transmits green and blue light.

Consequently, on the X-cube three channels result for red, green and blue light, $K_R$, $K_G$, $K_B$ and one channel $K_{R+B+G}$ for white light. On each of the coating systems 5, 7, between the addressed prism pairs, reflection at 45° of the incident light, thus colored light, takes place. The hypotenuse faces of the prisms 2 can be coated with an antireflection coating system.

Such X-cubes are mainly used today in projection apparatus in order to recombine red (R), blue (B), and green (G) light, each of which is supplied via light valves, in particular LCD light valves, operating in transmission to the associated channels $K_R$, $K_B$, $K_G$ in channel $K_{R+B+G}$ into white light. This is indicated in FIG. 1 in dashed lines. Light valves are therein image-forming elements comprising a multiplicity of individually driven pixels. The number of pixels therein yields the resolution according to EVGA, SGA, EGA, or XGA standards, etc.

Due to the printed conductor and the driving electronics a lower limit of the pixel size exists in the case of such light valves operating in transmission and it is only with difficulty possible to attain sizes below this limit. When decreasing the pixel size, furthermore, the optical aperture per pixel decreases.

The restriction does not apply in light valves which do not work in transmission but rather, as shown in solid lines using light valves LCD in FIG. 1, operate in reflection and therein rotate the plane of polarization of the reflected light by 90°.

The use of such light valves operating in reflection has been hindered until today by problems which will be explained later. In FIG. 2 the conditions are shown which obtain when replacing conventional light valves, which, according to FIG. 1, are LCD valves operating in transmission, by light valves RLV, which are reflective light valves operating in reflection. If, to the configuration according to FIG. 1, a light valve RLV operating in reflection is connected according to FIG. 2, for example, reflected S-polarized (direction of oscillation of the E field) blue light B reflected on coating system 5 of the X-cube according to FIG. 1, is converted on the light valve RLV into P-polarized blue light and reflected back onto the coating system 5 and, again, reflected by the latter. On one and the same coating system 5, according to FIG. 2, and, analogously, for red light on system 7, reflections of light of identical spectra but different polarizations occur.

Spectrally selectively reflecting and transmitting coating systems, such as are used in said X-cubes but also in other light splitters for color-selective effects, are conventionally produced by means of dielectric multicoating systems. These comprise each at least one layer of a material with lower refractive index and one layer of a material with higher refractive index. For example, as the material with lower refractive index $SiO_2$ is conventionally used, with a refractive index of 1.46. As the material with higher refractive index, for example, $TiO_2$ is used today with a refractive index of 2.4 or $Ta_2O_5$ with a refractive index of 2.1.

In FIG. 3 the reflection of S-polarized blue light on a color-selective coating system comprising $SiO_2/TiO_2$ is shown as well as that of P-polarized blue light on the same coating system. Both measurements took place at an angle of light incidence of 45°, as depicted in FIG. 2.

In FIG. 4 is shown on a coating system again composed of $SiO_2/TiO_2$ layers and selectively reflecting red light R, the reflection behavior of S-polarized and of P-polarized red light. The measurements of FIGS. 3, 4 were carried out on an X-cube with BK7 glass as the base body material wherein the listed color-selective coating systems 5, 7 or FIG. 2 were embedded.

In FIGS. 3 and 4 is evident that, on the one hand, in both cases the reflection of P-polarized light is significantly less than that of S-polarized light, quite pronounced on the red-selective coating system, and that further a marked edge shift—polarization shift—of the reflected spectra takes place. For example, with selective reflection of blue light the 50% reflection points for S- and P-polarization are spaced over 70 nm apart, corresponding to $\Delta_B$.

If in FIG. 2 the represented path of rays is considered, without taking into account the second color-selective coating system 7 provided on the X-cube, thus only the reflection on one coating system, namely the coating system 5 for blue light, one obtains $$I'_{Bout}{}^P = I_{in}{}^S \cdot R_{RB}{}^P \tag{1}$$

where $I_{Bout}{}^P$: intensity of the P-polarized blue light reflected back by coating system 5, $I_{in}{}^S$: intensity of the S-polarized blue light incident on coating system 5, $R_{RB}{}^S$: the reflection of the blue-selective coating system 5 for S-polarized blue light, $R_{RB}{}^P$: the reflection of the blue-selective coating system 5 for P-polarized blue light.

Starting from the reflection behavior shown in FIGS. 3 and 4 for blue light B on coating system 5 according to FIG. 2 and, analogously, for red light R on coating system 7, taking into consideration the particular transmitting coating systems, thus system 7 for blue light B or system 5 for red light R, respectively, intensity spectra for $I_{Bout}{}^P$ or for $I_{Rout}{}^P$ are obtained as shown in FIG. 5 or FIG. 6, respectively. Taking into consideration the stated transmissions, as well as according to FIG. 2 the reflection behavior of a potentially added light valve RLV operating in reflection, for blue light is obtained:

$$I_{Bout}{}^P = I_{in}{}^S \cdot T_{RR}{}^S \cdot R_{RB}{}^S \cdot R_{RLVB} \cdot R_{RB}{}^P \cdot T_{RR}{}^P \tag{2}$$

Therein denote further $T_{RR}{}^S$: the transmission of the red-selective coating system 7 for S-polarized light $R_{RLVB}$: the reflection of the light valve $T_{RR}{}^P$: the transmission of the red-selective coating system 7 for P-polarized light.

The expression for red light is obtained analogously.

The differing reflection properties of the selective red or blue coating systems with respect to S- and P-polarization lead to serious consequences:

The light from the spectral ranges $\Delta_B$ or $\Delta_R$ between the S- and P-reflection spectra according to FIGS. 3 and 4 is not output but passes correspondingly the blue or red reflector and remains as scattered light in the system, according to FIG. 2 in the X-cube.

In FIG. 7 the spectrum of the scattered light in the X-cube is shown with the stated intermediate spectral ranges $\Delta_B$ and $\Delta_R$ according to FIGS. 3 and 4 entered.

It is evident that a large quantity of scattered light remains in the system. Further, as evident in FIGS. 5 and 6, the total transmission in the red spectral range as well as also in the blue is insufficient, i.e. substantially less than it would be, in view of FIG. 2, if on both color-selective coating systems 5 and 7 only S-polarized light were to be reflected.

SUMMARY OF THE INVENTION

Starting from the described problems, the present invention poses the task of creating light splitters of the above stated type in which the differing color-selective behavior of the coating systems with respect to differently polarized light, is reduced or corrected, or to create an optical transmitter configuration with a light splitter with which this is also attained. As the light splitter of the transmitter configuration according to the invention is preferably used in combination a light splitter according to the invention.

Further, the scattered light in the light splitter or in the transmitter configuration is to be minimized and, if appropriate, the color location is to be optimized.

This task is solved, on the one hand, in the case of a light splitter of the type described in the introduction thereby that for the lower refractive index $N_{LS}$ applies:

$$1.70 \leq N_{LS} \leq 2.1.$$

As will yet be explained, this leads to the fact that the edge shift $\Delta$—the polarization shift—of the P- and S-reflection spectra, as explained in conjunction with FIGS. 3 or 4, is substantially reduced and, in addition, the reflection of P-polarized light is approximated to the value for S-polarized light.

In a preferred embodiment, the refractive index $N_{LS}$ is selected as:

$$N_{LS} = 1.8 \pm 2\%$$

As the material with higher refractive index is preferably used a material comprising at least as the major component an oxide or oxynitride, therein preferably a material from the series $TiO_2$, $Ta_2O_5$, $Nb_2O_5$, $HfO_2$, $ZrO_2$, $SiO_xN_y$, especially preferred $TiO_2$ and/or $Ta_2O_5$. All of these materials have indices of refraction of maximally 2.1.

The lower refractive index $N_{LS}$ selected according to the invention is preferably controlled thereby that as the associated material a mixed material is used comprising at least two materials $m_1$ and $m_2$, for the refractive index $N_{m1}$, $N_{m2}$, to which applies:

$$N_{m1} \geq 1.05 N_{LS}$$

$$N_{m2} \leq 0.95 N_{LS}.$$

The first material $m_1$ of the mixed material is preferably also a material used as the material with the higher refractive index, thus an oxide or oxynitride, therein preferably at least one of the above listed materials $TiO_2$, $Ta_2O_5$, $Nb_2O_5$, $HfO_2$, $ZrO_2$, $SiO_xN_y$, especially preferred $TiO_2$ and/or $Ta_2O_5$.

As the second material $m_2$ of the mixed material is preferably used $SiO_2$ and/or $Al_2O_3$ and/or $SiO_xN_y$ and/or $Y_2O_3$. By selecting the mixing ratio $m_1/m_2$ of the mixed material, the material with the lower refractive index, the desired refractive index $N_{LS}$ is realized. As the material with the lower refractive index, a mixed material is preferably used comprising $SiO_2$ and $TiO_2$ with an $SiO_2$ fraction $A_{SiO2} = (60 \pm 5)\%$ and a $TiO_2$ fraction $A_{TiO2}$ of $(100\% - A_{SiO2})$. $Y_2O_3$, having a refractive index of $1.8 \pm 2\%$, can therein also be used as the material with the lower refractive index.

The refractive index $N_K$ of the material of the at least one base body is preferably selected as follows:

$$1.52 \geq N_K \geq 1.$$

The value 1.52 corresponds therein to the refractive index of BK7 glass which is commonly used in particular for X-cubes. The stated body can also be fabricated of quartz glass with $$N_K = 1.45 \pm 2\%.$$

It is preferred if on the light splitter according to the invention both coating systems are implemented like said at least one. Furthermore, according to the invention and especially preferred, a light splitter implemented as an X-cube of the above described type is proposed, in which the coating systems are embedded substantially along diagonal planes of a base body cuboid which is preferably square in a cutting plane perpendicular to the common line of intersection of the coating systems.

To summarize: thus a formulation according to the invention of the solution of the above task is the specific selection of materials of the described coating systems.

A second solution of the above task is attained through a spectrally selective light splitter. In such a light splitter, which splits white light into red, green and blue light, respectively recombines white light from red, green and blue light, with two separate coating systems, each reflecting and transmitting color selectively, which are applied, or are embedded, on or in at least one transparent base body and on which the body defines emergent faces for the red, green and, respectively, blue light, at least on of the emergent faces with respect to the direction of the light emerging from it and reflected on at least one of the coating system is tilted such that the face normal of the emergent face forms with the stated direction, and acute angle φ which differs from 0°. Due to fabrication tolerances on the light splitter, angles between light emergent direction and the face normal differing from 0° may well occur in this case, but, on the one hand, such tolerance-dependent angle deviations are not reproducible and, on the other hand, the tolerance-dependent angle deviations due to production are prior known. The zero deviation realized according to the invention, in any event, is greater than the stated prior known tolerance deviation.

Preferably, and as yet to be explained, the addressed maximum angle deviations are 5°.

It is now possible to apply directly onto the emergent faces on such a light splitter light valves, operating in reflection with which, with respect to the coating systems, for example according to FIG. 2, light in S-polarization, incident on a considered coating system and to be spectrally divided, is reflected on the coating system at a different angle than the P-polarized light to be recombined of the same spectrum reflected by light valve RLV.

However, the possibility also exists of realizing the reflection angle shift on one and/or the other coating system without corresponding tilting of the emergent faces on the light splitter itself, i.e. without changing the light splitter itself by mounting the light valves at a corresponding relative tilt.

A corresponding optical transmitter configuration with a light splitter, with an incident and emergent face for white light and emergent faces each for red, blue and green light, comprises reflectors, operationally connected with the emergent faces of the stated light splitter, which reflectors change the polarization of light and on which the light emergent at the emergent faces is reflected at an angle deviating from 0° by more than is given through the fabrication tolerances of the total configuration. Such an optical transmitter configuration can now be realized through the direct application of light valves, operating in reflection, onto the tilted emergent faces of a light splitter or the reflector tilt can be realized through mechanical mounting measures, apart from the light splitter implementation proper.

The light splitter according to the invention considered by itself comprises preferably in combination the measures with respect to layer material as well as also the measures of realizing on the coating systems differing reflection angles specific to the direction of the incidence of rays, as is specified by the light splitter. Furthermore, an optical transmitter, in principle with tilted reflectors, preferably comprises also the solution characteristics with respect to specific layer materials on the light splitter.

The light splitter according to the invention considered by itself comprises preferably in combination the measures with respect to layer material as well as also the measures of realizing on the coating systems differing reflection angles specific to the direction of the incidence of rays, as is specified by the light slitter according to claim 10. Furthermore, an optical transmitter, in principle with tilted reflectors according to claim 12, preferably comprises also the solution characteristics with respect to specific layer materials on the light splitter as specified according to the wording of claim 13.

Each of the principles according to the invention, namely the material selection according to the invention of one, preferably of both of the coating systems and/or reflection specific as to direction of incidence on at least one, preferably on both coating systems, now permits working with reflecting light values in particular also in the case of projector configurations.

An optical transmitter configuration, on which the stated tilt is realized and/or which comprises a light splitter with the material selection according to the invention of the coating systems, preferably comprises further a polarization beam splitter at the input side and/or an HMI lamp as an illumination source.

Said HMI lamp has in its light spectrum low energy values where the range of spectral shift range also is located of the reflection behavior with respect to S- and P-polarized light, i.e. corresponding to the spectral ranges $\Delta_R$ and $\Delta_B$ according to FIGS. 3 and 7.

The invention will now be explained further by example with reference to the FIGS.

Figure 8:
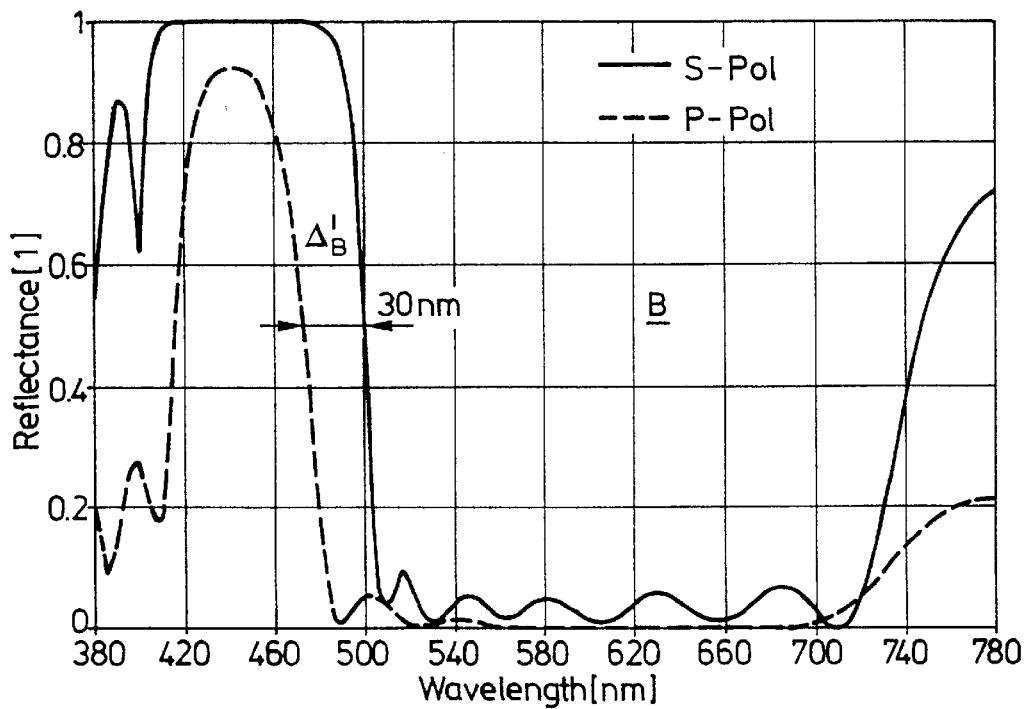
Figure 9:
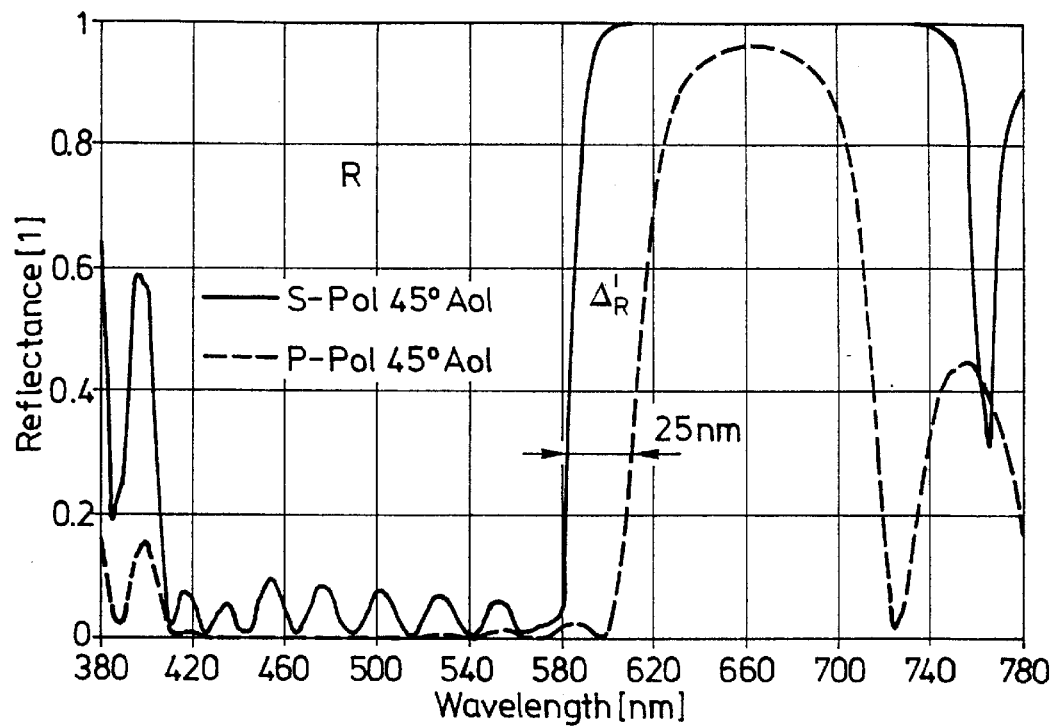
Figure 10:
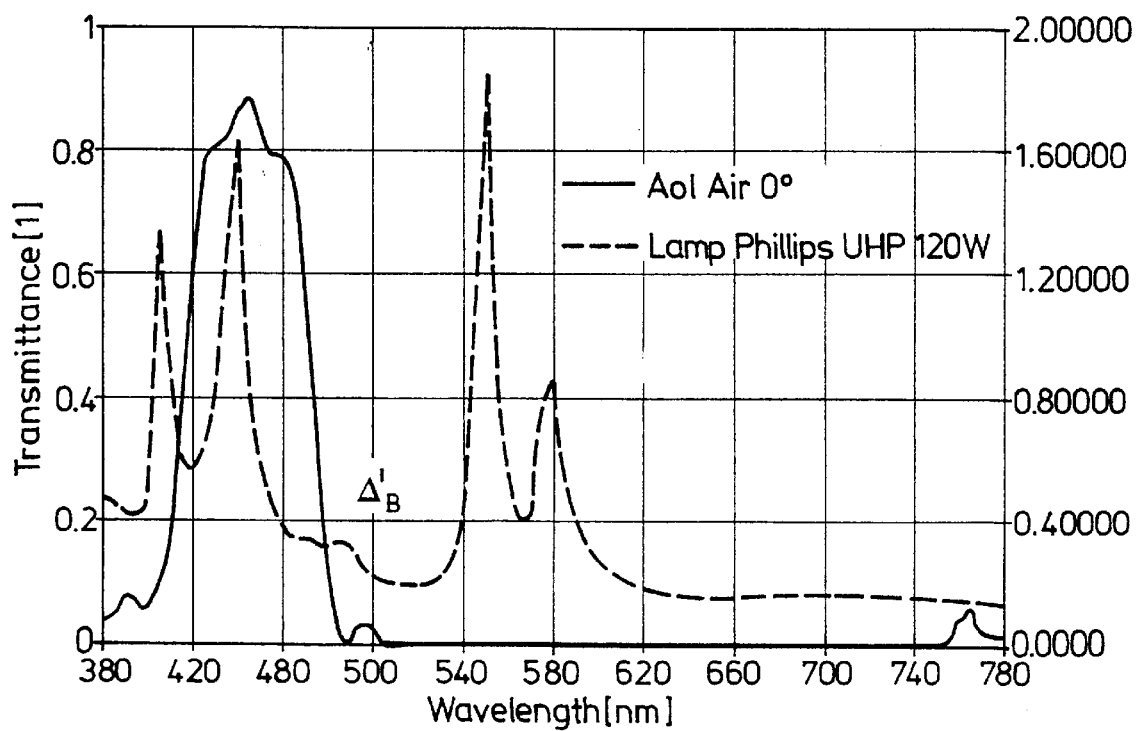
Figure 11:
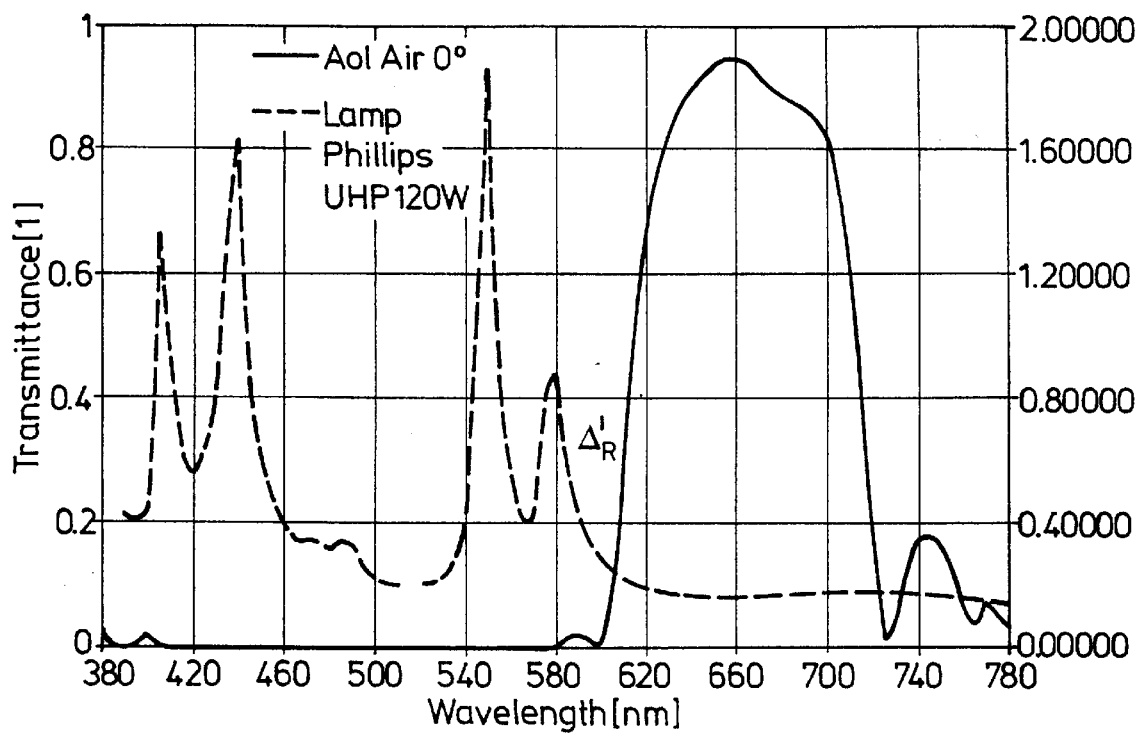
Figure 12:
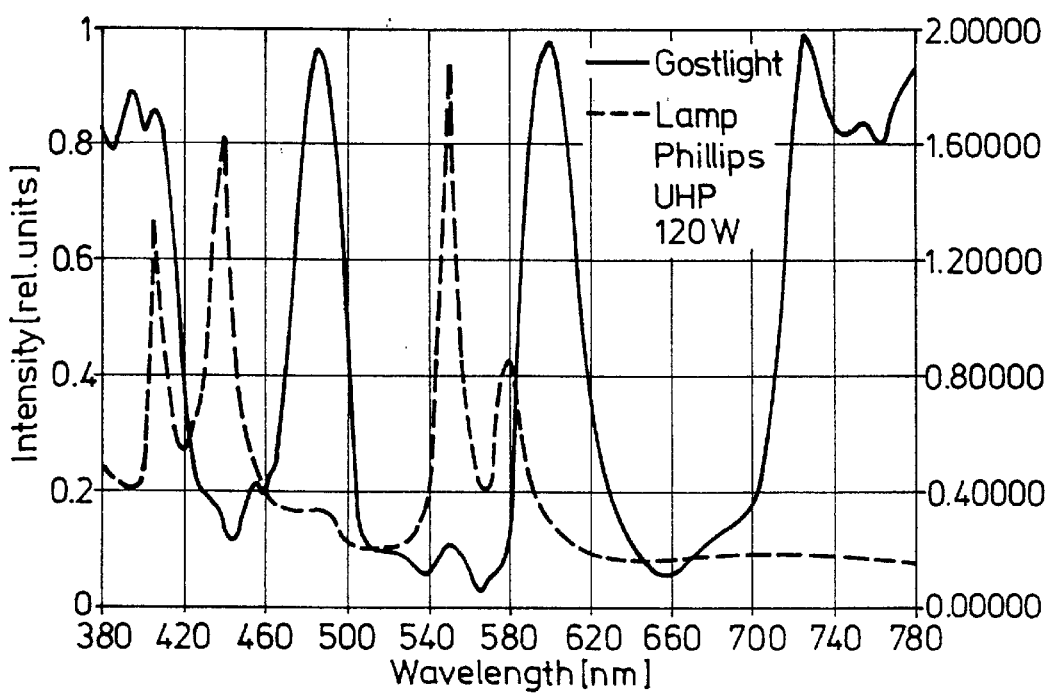
Figure 13:
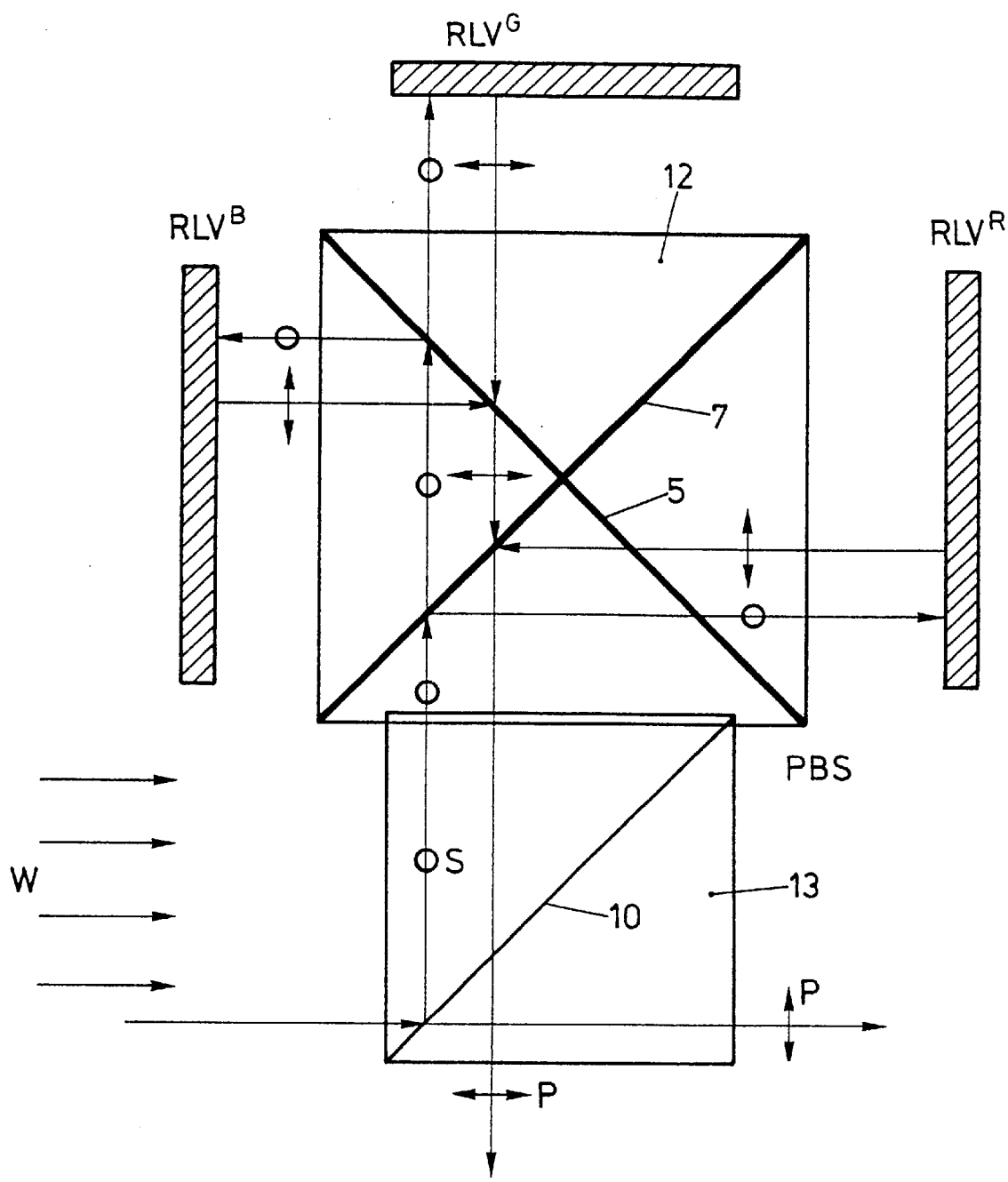
Figure 14:
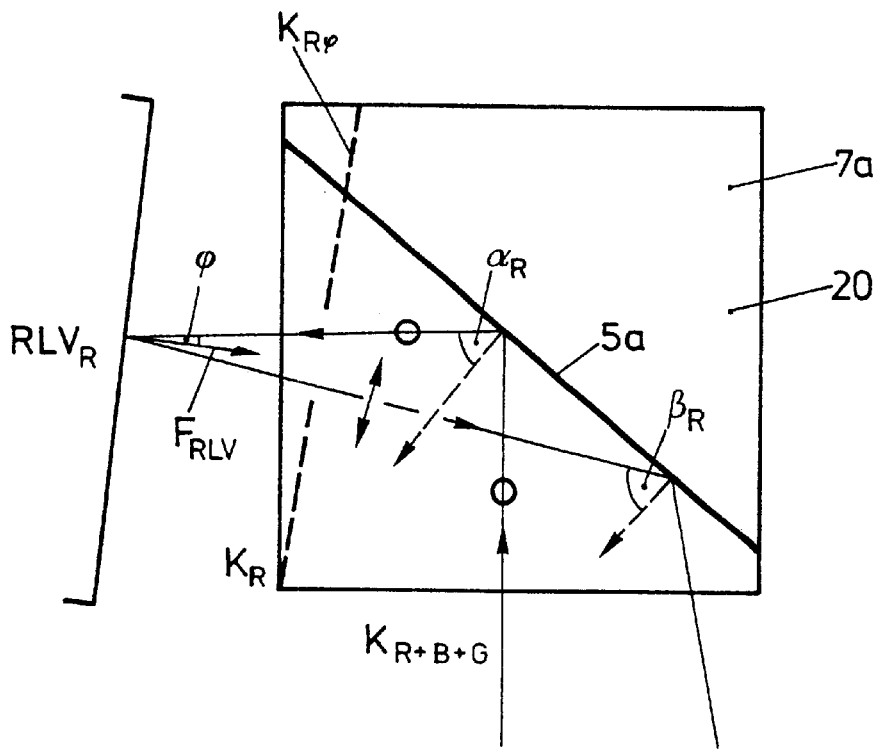
Figure 15:
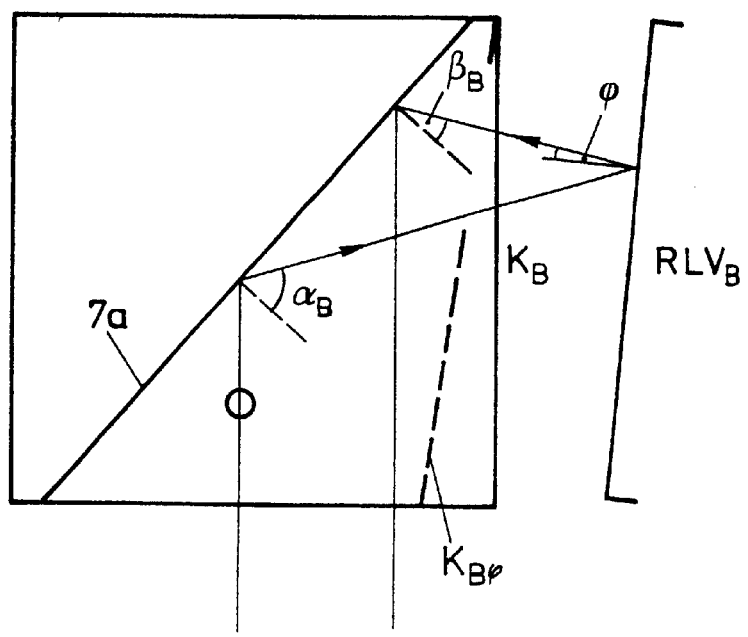
Figure 16:
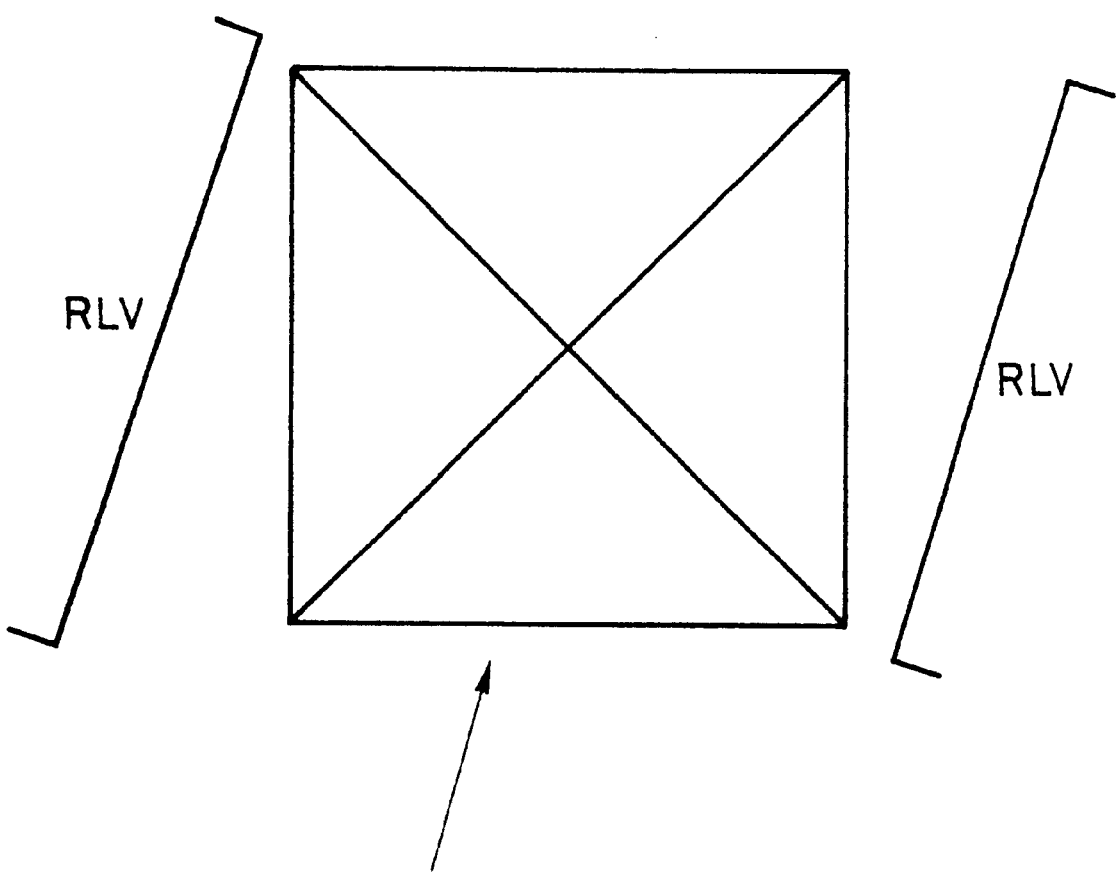
Figure 17:
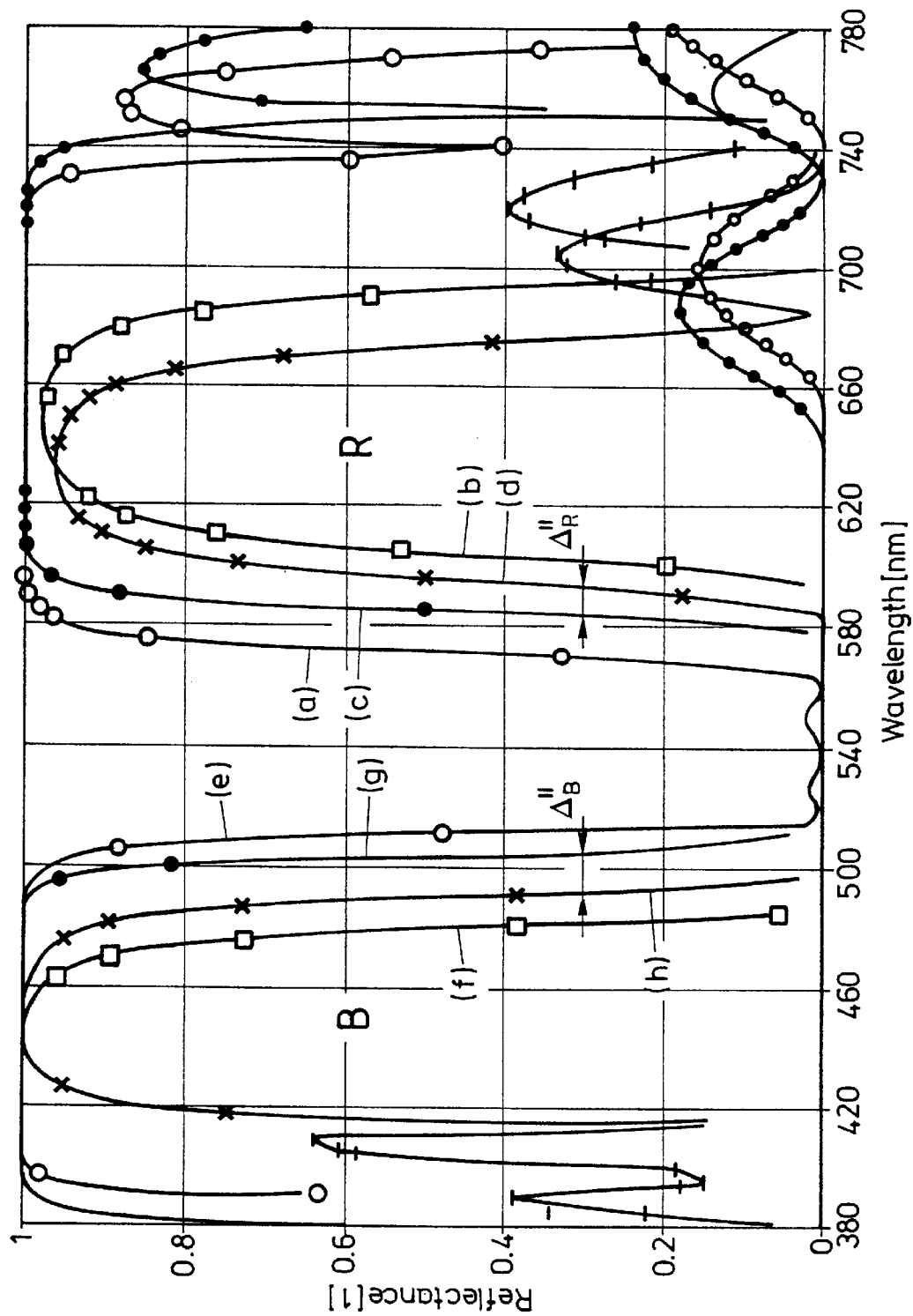
Figure 18:
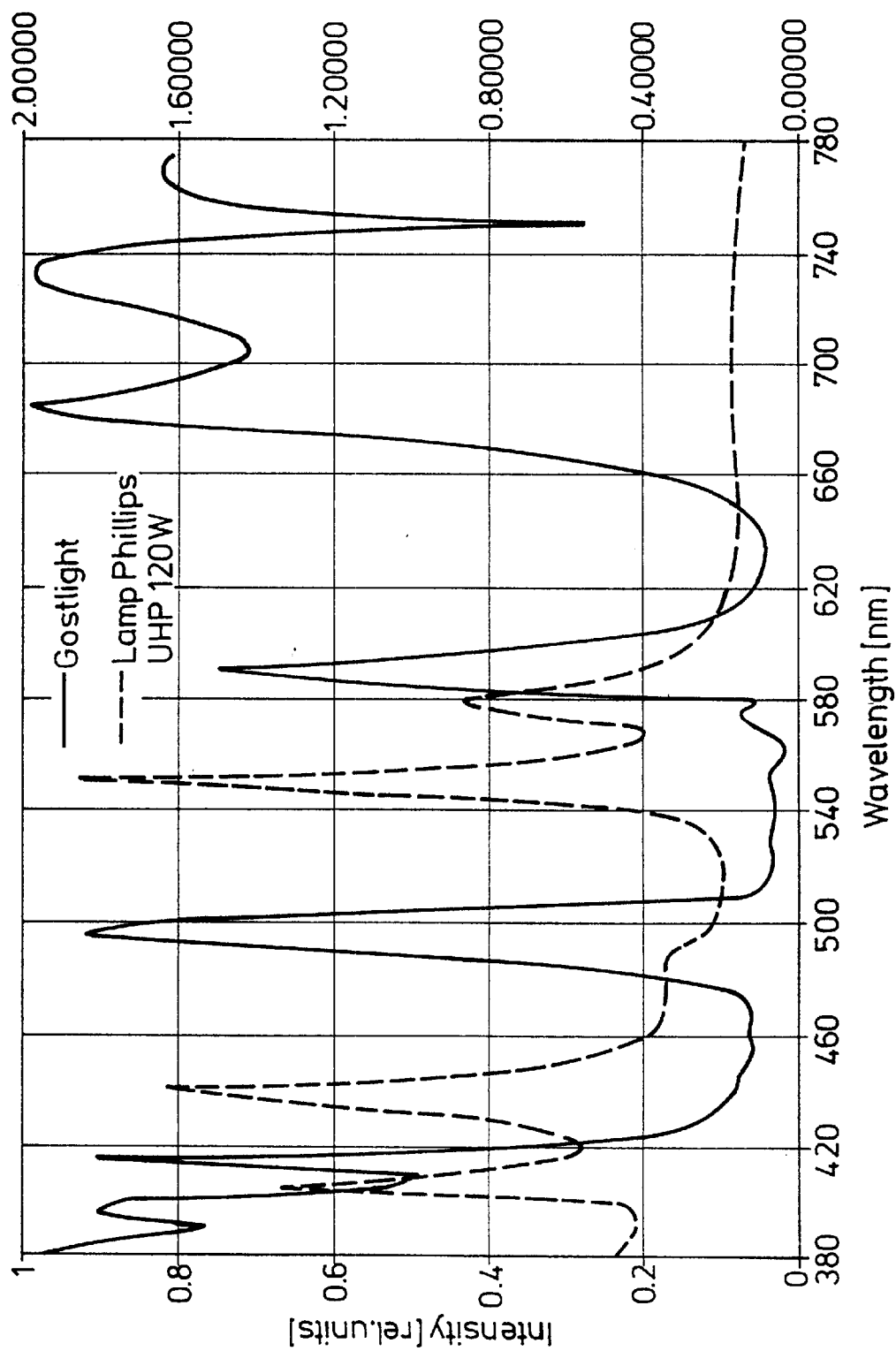

Therein depict:

FIG. 8 the reflection of blue light on a light splitter according to the invention with a layer material selection according to the invention for S- and P-polarizations, FIG. 9 in a representation analogous to FIG. 8 the reflection resulting with the layer material selection according to the invention of red light in S- and P-polarization, FIG. 10 the total transmission of blue light in an X-cube with the layer materials selected according to the invention, i.e. with coating systems which in each instance lead to the results according to FIGS. 8 and 9, as well as the spectrum of an HMI lamp, FIG. 11 in a representation analogous to FIG. 10 the spectrum of the total transmission of red light as well as of said HMI lamp registered on the same X-cube, FIG. 12 the spectrum of the scattered light resulting on said X-cube according to the invention as well as of said HMI lamp, FIG. 13 schematically a first optical transmitter configuration according to the invention in the form of a projection configuration according to the invention with a light splitter according to the invention with the materials of the coating systems selected according to the invention, FIG. 14 schematically and only shown with one of the coating systems, an X-cube and light valve configuration in order to explain the invention under the aspect of its tilt with respect to red light, FIG. 15 in a representation analogous to FIG. 14, the conditions for blue light, FIG. 16 a simple realization possibility of the invention under the aspect of its tilt using a conventionally formed X-cube, and FIG. 17 spectra of the red and blue light in order to explain the effect of the tilt according to the invention, and FIG. 18 in analogy to FIG. 12, the residual light spectrum resulting in an X-cube with combined solutions according to the invention according to the spectra of FIG. 17, with the spectrum of the HMI lamp Phillips UHP 120 W.

DESCRIPTION OF THE PREFERRED EMBODIMENTS

The results presented in the following in conjunction with FIGS. 8 to 12, were measured using a configuration such as is represented in principle in FIG. 2. An X-cube was provided with color-selective coating systems 5 or 7, respectively. The material with the higher refractive index in the coating systems 5, 7 was $TiO_2$, the material with the lower refractive index was a mixed material comprising $SiO_2$ and $TiO_2$ in a mixing ratio of $A_{SiO2}/A_{TiO2}=60/40$. The body of the X-cube comprised quartz glass.

The effects of the transmission, resulting in the reflection measurements on the particular noninvolved coating system—thus for blue light the red-selective system 7 and for red light the blue-selective system 5—in particular the transmission difference for S and P-polarized red or blue light, respectively, were negligible.

Figure 1:
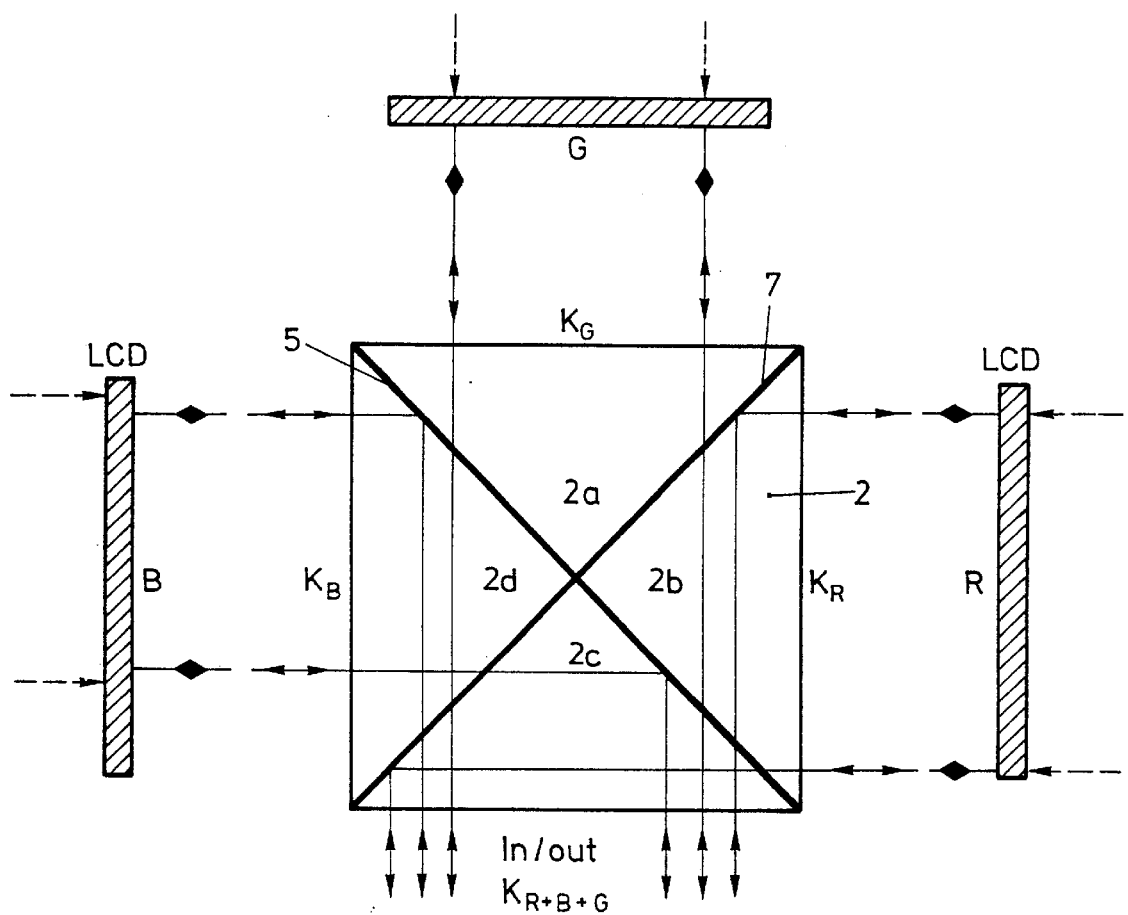
FIG. 1 is a schematic optical transmission configuration of an X-cube.
Figure 2:
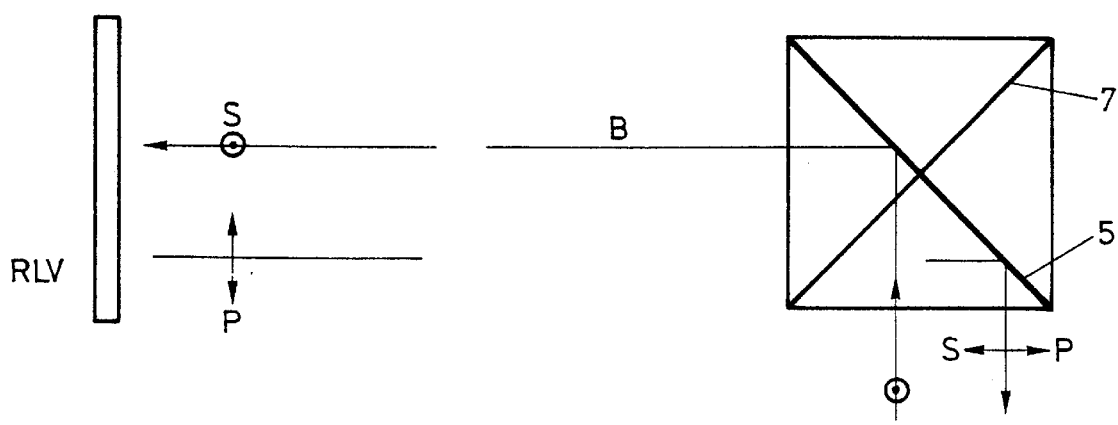
FIG. 2 illustrates conditions occurring when replacing conventional light valves.
Figure 3:
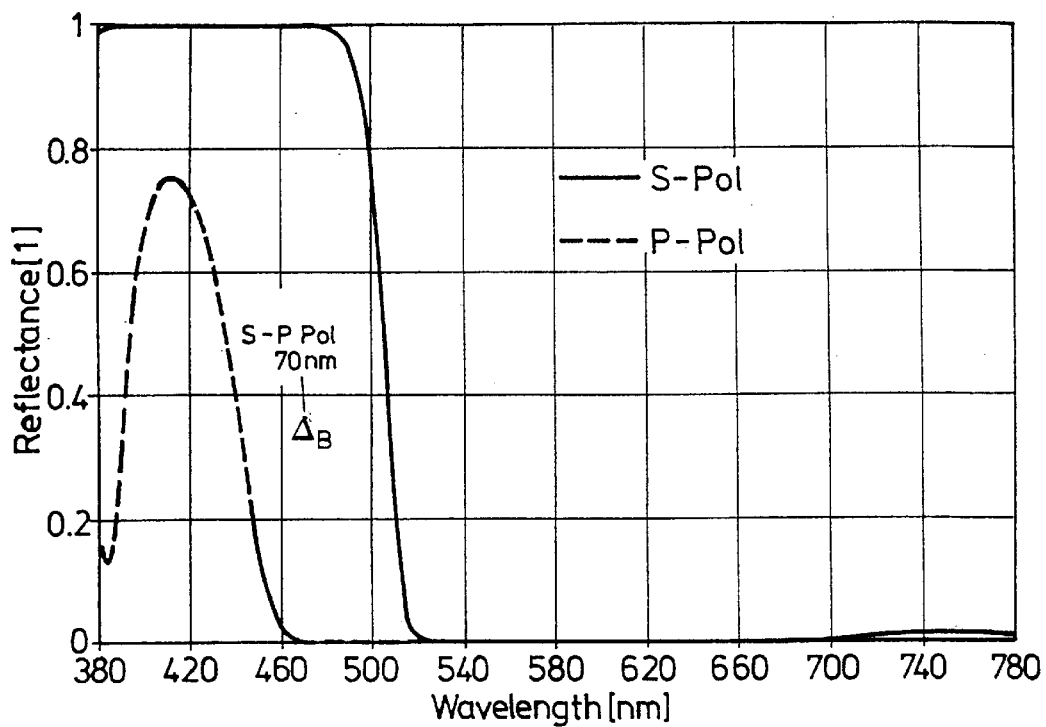
FIGS. 3, 4, 5, 6 and 7 are each graphs plotting reflectants or intensity of light against wavelength.

On the configuration of FIG. 2, in analogy to FIG. 3, in an X-cube with $TiO_2$ as the material with the higher refractive index and $SiO_2$ as the material with the lower refractive index on the light splitter according to the invention, were measured spectra for reflected blue light B in S- and P-polarization, represented in FIG. 8, and analogously for red light R in FIG. 9. The refractive index $N_{LS}$ within the range $$1.7 \leq N_{LS} \leq 2.1$$

was selected as 1.8±2%.

Due to the selection of said mixing ratio of the mixed material with lower refractive index, and thus the setting of the lower refractive index, a substantial reduction of the polarization shift $\Delta_B$ or $\Delta_R$, respectively, is attained and thus a substantial approximation of the reflection spectra edges of S- and P-polarized light. If, in the case of prior known optical structural components according to FIG. 3 at 50% reflection a polarization shift of 70 nm results between the reflection spectrum for S- and P-polarized light, in the case of the structural component according to the invention a polarization shift of only 30 nm is obtained for this light. Similarly, for red light at 30% reflection on the structural component according to the invention a polarization shift of only 25 nm results while the same value on prior known structural elements is 50 nm according to FIG. 4.

Further, the maximum reflection of P-polarized blue light according to the invention and according to FIG. 8, is approximately 92% of that of S-polarized blue light while in prior known structural components according to FIG. 3 this value is only 75%. As is readily apparent, with respect to red light, the maximum reflection attained according to the invention with P-polarization is 97% of that with S-polarization while in the case of prior known structural components according to FIG. 4, the former is only 40%.

In FIG. 10 in the case of the system, according to FIG. 2, as defined above and structured according to the invention the total transmission of blue light is depicted and, correspondingly in FIG. 11, the total transmission of red light, thus over the light division on the X-cube, reflection on RLV and light recombination on the X-cube.

Figure 7:
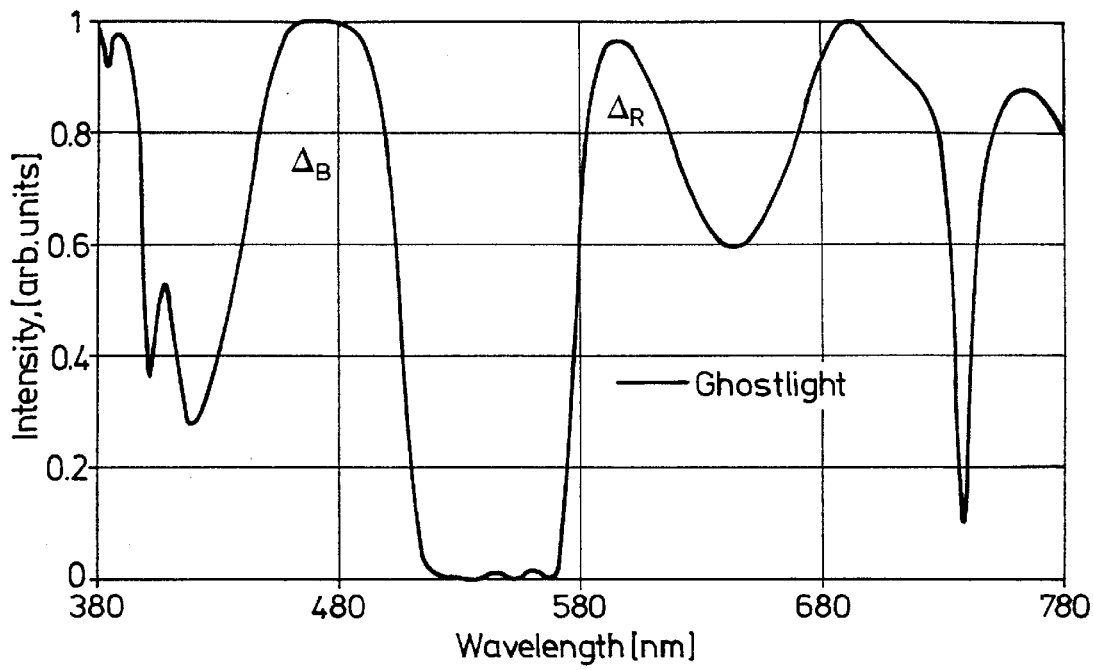

An HMI lamp, for example a lamp UHP 120 W by Phillips, yields the lamp spectrum Δ also entered in FIGS. 10 and 11. It is evident that the lamp spectrum has low energy or a low intensity where the blue light, due to the still remaining polarization shift $\Delta'_B$ according to FIG. 8, has a low transmission in any event. As is extremely advantageous, the lamp spectral line is additionally at 580 nm, corresponding to the yellow lines faded out through the coating system provided according to the invention (see FIG. 10), which prevents a green coloration of the blue component or orange coloration of the red component. Based on the comparison of the scattered light spectrum of FIG. 12 with that resulting on a conventional X-cube according to FIG. 7, it is evident that the total scattered light losses in the case of the light splitter, realized according to the invention with coating system materials selected according to the invention, are substantially less than in the case of a conventional light splitter of said type, in particular also if the light splitter according to the invention is combined with an HMI light source.

In FIG. 13 is depicted the realization of a projector according to the invention in which, due to the implementation according to the invention of the optical light splitter structured as an X-cube, namely with coating system materials selected according to the invention, light valves RLV operating in reflection are used.

White light, S-polarized or both, S- and P-polarized, is incident on a polarization beam splitter 13. The coating system 10 of the beam splitter, in known manner, has the property of deflecting S-polarized light by 90° and of allowing P-polarized light to pass. The P-polarized light can also be reflected back to the light source by means of a mirror (not shown). The S-polarized white light enters the X-cube 12, structured as explained in conjunction with FIG. 2 but comprising the coating system materials according to the invention. At the three emergent faces, corresponding to the three color channels, of the X-cube 12 are provided light valves $RLV^R$, $RLV^G$, and $RLV^B$, operating in reflection. With a change in the polarization, the light of the particular associated spectra is there reflected back in P-polarized form onto the associated color-selective reflection coating systems, implemented according to the invention, and output after recombination by the polarization beam splitter 13. Thus the light is split in the X-cube in S-polarization into RGB and in the same X-cube recombined from RGB in P-polarization. The P-polarized light can traverse unhindered through the polarizing beam splitter 13 and is projected via projection optics onto a (not shown) screen.

With reference to FIG. 14, the second solution according to the invention of the above posed task will be explained in principle, the solution of which, as already mentioned, can be optimally combined with the just described solution, namely the special coating system material selection.

Again, the problem to be solved is given thereby that, as has been explained in connection with FIGS. 3 and 4, on the particular coating systems of a light splitter a decisive polarization shift of the reflected spectra, corresponding to $\Delta_B$ and $\Delta_R$, is generated.

In principle, and in view of said Figures, is to be attained:
to shift the spectral edge of the reflected red light in S-polarization (see FIG. 4) toward longer wavelengths;
to shift the spectral edge of the reflected red light in P-polarization toward shorter wavelengths;
to shift the spectral edge of the reflected blue light in S-polarization toward shorter wavelengths; and
to shift the spectral edge of the reflected blue light in P-polarization toward longer wavelengths.

It is highly surprising that all of these conditions can, in principle, be met thereby that the angle of incidence for P- and S-polarized light on the associated coating systems are selected so as to be different. This approach will be explained in principle with reference, to FIG. 14. Apart from conditions yet to be explained, this Figure shows schematically an X-cube 20 with the one coating system 5a—the red reflector—as well as a light valve RLV operating in reflection and, for the sake of clarity, shown only for one channel.

Essential in the solution according to the invention is that the light incident on RLV arrives on RLV at an angle $\phi$ deviating from 0°, with respect to the face normal $F_{RLV}$ and no longer, as for example according to FIGS. 2 or 13, at an angle $\phi=0°$.

Figure 4:
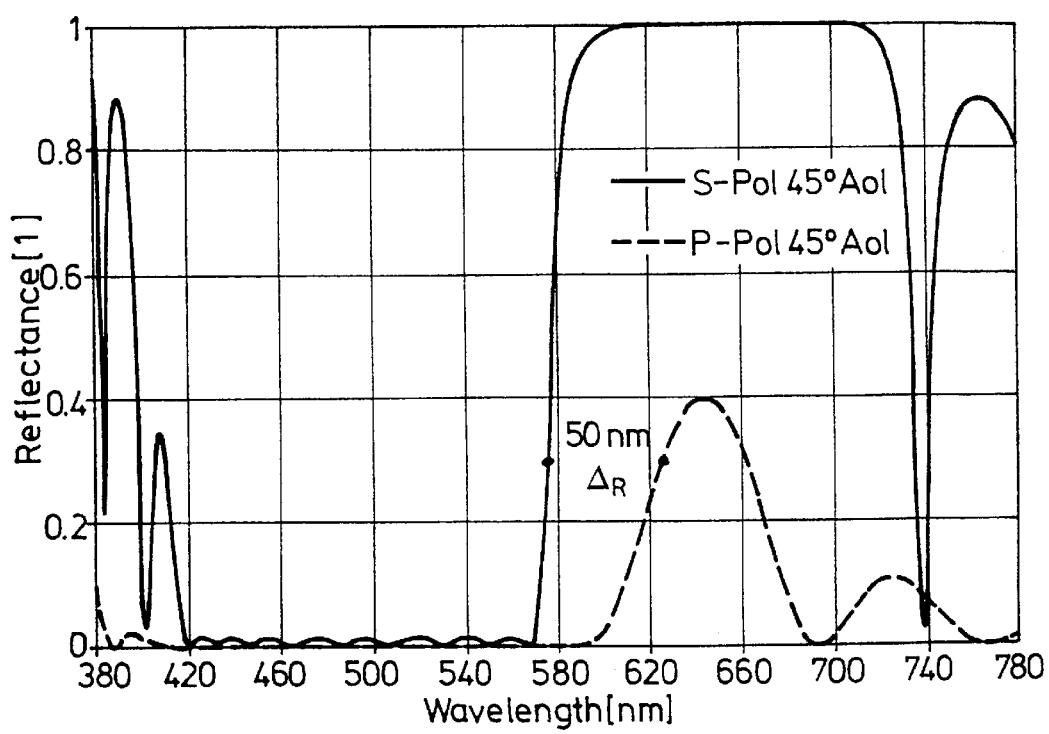
Figure 5:
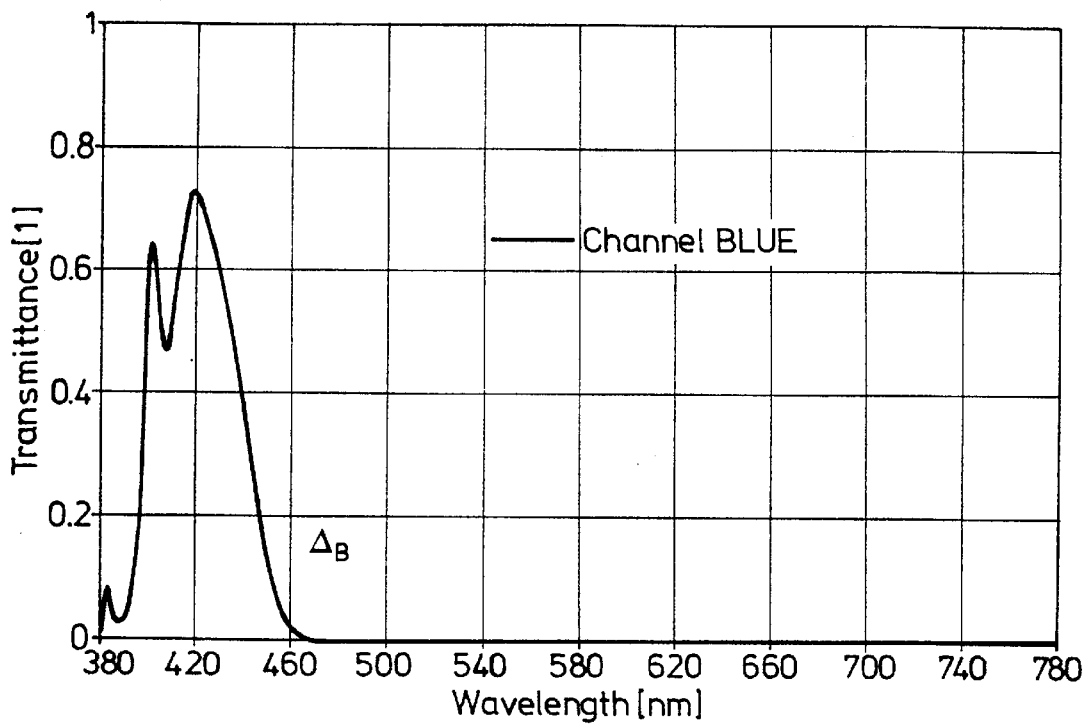
Figure 6:
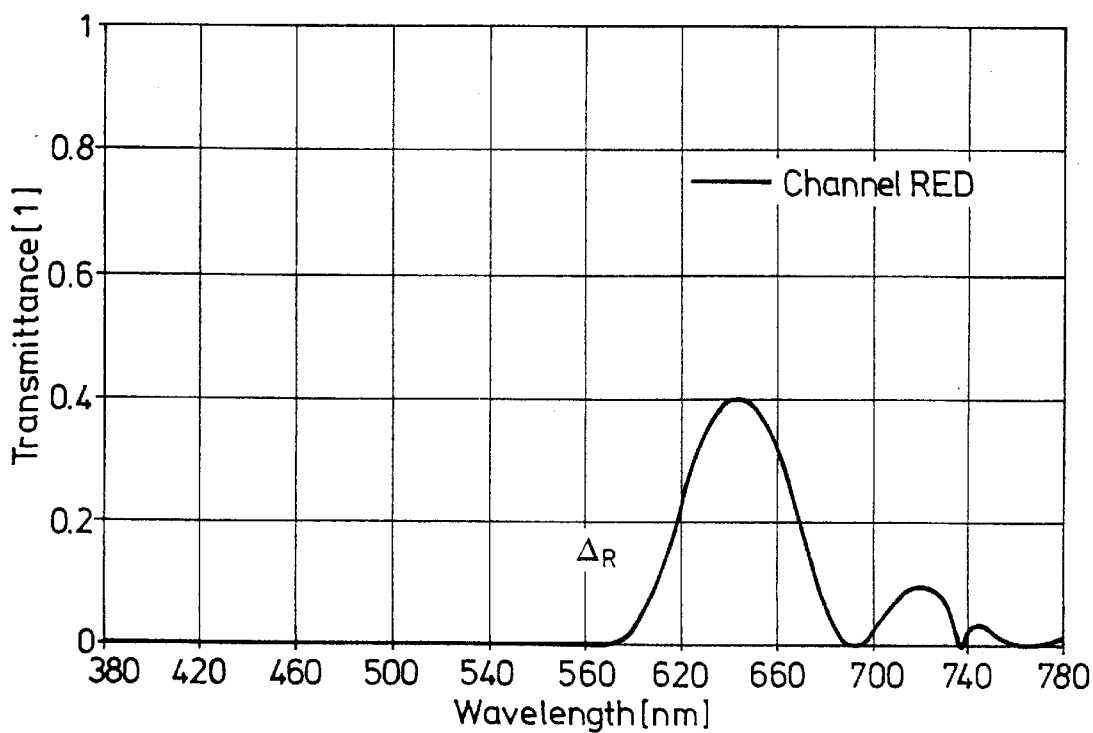

The requirements made of the spectrum of the red light for a decrease of the polarization shift according to FIG. 4 are now met thereby that the angle of reflection $\alpha_R$ for the S-polarized red light is selected to be smaller than the angle $\beta$ for the P-polarized red light.

Conversely, the conditions with respect to polarization shift of the spectra of the blue light are met thereby that, as shown in FIG. 15, the angle of reflection $\alpha_B$ of the blue light in S-polarization on the coating system 7a is greater than the angle of reflection $\beta_B$ of the blue light reflected by the associated light valve RLV. According to FIGS. 14, 15 on the red reflector or blue reflector coating system 5a, 7a obtains $\beta_R=\alpha_R+2\phi$ $\beta_B=\alpha_B-2\phi$.

Angle $\alpha$ is controlled through the geometric relative position of the coating system 5a according to FIG. 14 with respect to the direction of the light incident on channel $K_{R+B+G}$, angle $\beta$ as a function of this angle of incidence a as well as the angular orientation of the reflector on RLV with respect to the light emergent at channel $K_R$ or $K_B$.

With respect to red light as well as also with respect to blue light, in a preferred embodiment the particular angle $\alpha$ and $\beta$ is symmetrically 45°. If the deviation of the particular angles $\alpha$, $\beta$ from 45° is denoted by $\delta$, $45°\pm\delta=\alpha$ $45°\pm\delta=\beta$ is obtained where the upper sign applies in each case for blue light at reflector 7a according to FIG. 15, the lower sign for the conditions at the red channel with reflector 5a according to FIG. 14. Therefrom results $\phi=\delta$.

In a further preferred embodiment, $\delta$ is selected as $0<\delta\leq5°$.

It follows that on the light valve $RLV_R$, associated with the red channel $K_R$, and/or on light valve $RLV_B$, associated with the blue channel $K_B$, preferable on both, the incident light is to be reflected at an angle $\phi$ greater than 0° and preferably maximally 5°. Since small angles of incidence $\phi$ which deviate from 0° can also be caused by fabrication, this angle $\phi$ of 0° can be selected to deviate to an extent which is above that caused by fabrication tolerances.

As is readily evident in FIGS. 14 and 15, the particular angle $\alpha$ is determined by the relative orientation of the particular coating system 7a or 5a and the direction of light incidence of the light entering through channel $K_{R+B+G}$ for white light.

The geometric conditions according to the invention on light splitters and valves RLV, in particular X-cubes and light valves RLV, as shown qualitatively in FIGS. 14 and 15, can be realized through specific formation of the X-cube or the light splitter itself, namely by tilting their emergent faces corresponding to $K_R$ or $K_B$ as well as their coating systems 5a and 7a and direct application of the valves on the tilted faces (in FIGS. 14, 15 in dashed lines at $K_{R\phi}$, $K_{B\phi}$). Alternatively—and simpler—the "tilting" is realized through the corresponding positioning of the RLVs and the implementation of illumination or recombination optics, with the X-cube or light splitter remaining geometrically unchanged.

A simple realization form results according to FIG. 16 and, as readily comprehensible based on the combined consideration of FIGS. 14 and 15, thereby that an X-cube, such as shown for example in conjunction with FIG. 2, is tilted with respect, for example, to light valves RLV disposed in parallel.

In FIG. 17 several spectra for red and blue light are shown, as measured on an X-cube on which both solutions according to the invention were combined, namely, on the one hand, material selection of the coating systems according to the invention, and, on the other hand, layout of the angle of incidence according to the invention. These spectra were measured on X-cubes leading already to the above described spectra according to FIGS. 8 and 9.

In the red spectra of FIG. 17 denote:
(a) the spectrum of the reflected S-polarized red light at an angle of incidence $\alpha_R$ according to FIG. 14 on the red reflector 5, according to the invention, of 45°. This spectrum corresponds to the one spectrum of FIG. 9.
(b) The spectrum of the reflected P-polarized red light reflected on the red reflector 5, according to the invention, at $\beta_R=45°$.

These spectra, again, show clearly the reduction attained of the polarization shift according to FIG. 9 according to the invention, through the selection of the material of the coating systems.

(c): The spectrum of S-polarized red light on the same red reflector 5 according to the invention, reflected at $\alpha_R=42°$.
(d): The spectrum of P-polarized red light reflected on the same red reflector 5 at $\beta_R=48°$.

Comparison of the spectra (c) and (d) shows readily that the remaining polarization shift $\Delta''_R$ is again reduced by practically 50% through the specific polarization-dependent layout of the angles of incidence $\alpha_R$, $\beta_R$.

In the blue spectra B of FIG. 17 denote:
(e): The spectrum of reflected S-polarized blue light reflected on the blue reflector 7, laid out according to the invention with respect to the layer materials, at an angle of incidence $\alpha_B=45°$.
(f): The spectrum of the reflected P-polarized blue light on the blue reflector 7, according to the invention, with $\beta_B=45°$.

This spectrum corresponds to that of FIG. 8.

Between spectra (e) and (f) the polarization shift $\Delta'_B$ according to FIG. 8 is evident.

(g): The spectrum of the S-polarized blue light reflected on the blue reflector 7 implemented according to the invention, with $\alpha_B=48°$.

(h): The spectrum of the P-polarized blue light reflected on the blue reflector 7 implemented according to the invention, with $\beta_B=42°$.

Again, spectra (g) and (h) reveal the further reduction of the polarization shift with respect to that attained already through the layer material selection alone according to the invention according to FIG. 8.

In FIG. 18, in analogy to the representation according to FIG. 12, on the one hand, the spectrum of an HMI lamp, namely the UHP 120 W by Philips, is shown, on the other hand, the spectrum of scattered light, attained with an X-cube with the coating systems laid out according to the invention as well as with the polarization-specific layout of the angles of incidence $\alpha$, $\beta$ according to the spectra of FIG. 17.

It is readily possible to implement on the light splitter according to the invention, in particular an X-cube, for example only the coating system 5 forming the red reflector with the materials according to the invention and to realize the layout of the angles of incidence according to the invention, for example according to FIG. 16, by tilting the X-cube.

What is claimed is:

1. A method for manufacturing an X-cube having a spectrally selective light splitter and recombining device, which divides white light into red, green and blue light being output and recombines red, green and blue light being input substantially independently of light polarization, comprising the steps of:

providing two coating systems, each reflecting and transmitting color-selectively;

embedding said coating systems in at least one transparent base body;

providing in at least one of said coating systems at least one layer of a material with lower refractive index as well as at least one layer of a material with higher refractive index;

selecting for the lower refractive index $N_{LS}$:

$1.7 \leq N_{LS} \leq 2.1$; and selecting for the refractive index $N_K$ of the at least one transparent base body:

$1.52 \geq N_K \geq 1$.

2. A method according to claim 1, wherein $N_{LS}=1.8\pm2\%$.

3. A method according to claim 1, wherein the material with the lower refractive index is a mixed material comprising at least two materials $m_1$, $m_2$, Wherein: $N_{m1} \geq 1.05 N_{LS}$ and $N_{m2} \leq 0.95 N_{LS}$.

4. A method according to claim 1, wherein the material with the higher refractive index substantially comprises an oxide or oxynitride selected from the group consisting of: $TiO_2$, $Ta_2O_5$, $Nb_2O_5$, $HfO_2$, $ZrO_2$, $SiO_xN_y$.

5. A method according to claim 1, wherein the material with the lower refractive index comprises $TiO_2$ and/or $Ta_2O_5$ as well as at least one of: $Y_2O_3$, $SiO_2$, $Al_2O_3$, $SiO_xN_y$; and the material with the lower refractive index comprises at least predominantly $SiO_2$ and $TiO_2$, with a ratio of the fractions of $A_{SiO2}=(60\pm5)\%$ and $A_{TiO2}=(100\%-A_{SiO2})$.

6. A method according to claim 1, wherein the material with the lower refractive index comprises $Y_2O_3$.

7. A method according to claim 1, wherein, for the refractive index $N_k$ of the material of the at least one base body:

$N_k=1.45\pm2\%$.

8. A method according to claim 1, wherein both coating systems are implemented like said at least one coating system.

9. A method according to claim 1, wherein the coating systems are substantially embedded along diagonal planes of a base body cuboid, which is at least approximately square considered in a cutting plane perpendicular to a common line of intersection of the coating systems.

10. A method according to claim 1, wherein at least one of the emergent faces for the light reflected on at least one of the coating system and resulting from the splitting, is tilted with respect to the direction of emergence of the light such that its face normal forms with said direction an angle p deviating from zero and specifically by more than is caused by fabrication tolerances of the light splitter, for which applies: $\phi \leq 5°$.

11. A method for manufacturing a spectrally selective light splitter and recombining device, which divides white light into red, green and blue light being output at respective output surfaces and recombines red, green and blue light input to respective ones of said output surfaces, comprising the steps of:

providing at least two separate coating systems, each reflecting or transmitting color-selectively;

embedding or applying said coating systems on or in at least one transparent base body;

determining by said at least one body an emergent face each for the red, green and blue light;

tilting at least one emergent face with respect to the direction of the light emergent from it and reflected on at least one of the coating systems, such that its face normal forms with this direction an angle p deviating from zero, specifically by more than is caused by fabrication tolerances of the light splitter, for which $\phi \leq 5°$.

12. A method according to claim 11, wherein at least one of the coating systems comprises at least one layer of a material with lower refractive index as well as at least one layer of a material with higher refractive index, wherein for the lower refractive index $N_{LS}$: $1.7 \leq N_{LS} \leq 2.1$; and wherein, for a refractive index $N_k$ of the at least one transparent base body: $1.52 \geq N_K \geq 1$.

13. A method according to claim 12, wherein $N_{LS}=1.8\pm2\%$.

14. A method according to claim 12, wherein the material with the lower refractive index is a mixed material comprising at least two materials $m_1$, $m_2$, wherein:

$N_{m1} \geq 1.05 N_{LS}$ and $N_{m2} \leq 0.95 N_{LS}$.

15. A method according to claim 12, wherein the material with the higher refractive index substantially comprises at least an oxide or oxynitride.

16. A method according to claim 12, wherein the material with the lower refractive index comprises at least one of the following materials: $TiO_2$, $Ta_2O_5$, $Nb_2O_5$, $HfO_2$, $ZrO_2$, $SiO_xN_y$, and the material with the lower refractive index comprises predominantly $SiO_2$ and $TiO_2$, with a ratio of the fractions of $A_{SiO2}=(60\pm5)\%$ and $A_{TiO2}=(100\%-A_{SiO2})$.

17. A method according to claim 12, wherein the material with the lower refractive index comprises $Y_2O_3$.

18. A method according to claim 12, wherein the refractive index $N_k$ of the material of the at least one base body is: $N_k=1.45\pm2\%$.

19. A method according to claim 12, wherein both coating systems are implemented like said at least one coating system.

20. A method according to claim 12, wherein the device is an X-cube in which the coating systems are substantially embedded along diagonal planes of a base body cuboid, which is at least approximately, square considered in a cutting plane perpendicular to the common line of intersection of the coating systems.

21. A method according to claim 12, wherein at least one of the emergent faces for the light reflected on at least one of the coating systems and resulting from the splitting, is disposed tilted with respect to the direction of emergence of this light such that its face normal forms with said direction an angle p deviating from zero and specifically by more than is caused by fabrication tolerances of the light splitter, for which: $\phi \leq 5°$.

22. A method according to claim 11, wherein the device is implemented as an X-cube.

23. A method according to claim 11, including, adjacent said output surfaces, providing reflectors for respective of said output light, which reflectors change polarity of light as reflected and wherein light output from respective ones of said output surfaces is reflected at an adjacent surface of respective ones of said reflectors under an angle which deviates more from 0° than caused by manufacturing tolerances of the device, and wherein each of the reflectors is formed by configurations of reflecting light valves.

24. A method according to claim 23, wherein the light is reflected on the reflectors at an angle $\phi$ wherein: $0° < \phi \leq 5°$, with the angle deviating from zero by more than is caused by fabrication tolerances.

25. A method according to claim 23, wherein the light reflection at the specified angle takes place on more than one of the reflectors.

26. A method according to claim 23, wherein an incident face of the light splitter for the light to be divided comprises one of a polarization beam splitter and an HMI lamp as the illumination source for the incident face.

27. A method according to claim 11, including providing at least two coating systems, each reflecting and transmitting color selectively, said coating system being applied or embedded on or in at least one transparent base body, and wherein at least one of the coating systems comprises at least one layer of a material with lower refractive index as well as at least one layer of a material with higher refractive index, wherein for the lower refractive index $N_{LS}$: $1.7 \leq N_{LS} \leq 2.1$; and wherein, for a refractive index $N_k$ of the at least one transparent base body: $1.52 \geq N_K \geq 1$.

28. A method according to claim 27, wherein $N_{LS}=1.8\pm2\%$.

29. A method according to claim 27, wherein the material with the lower refractive index is a mixed material comprising at least two materials $m_1$, $M_2$, to which materials:

$N_{m1} \geq 1.05 N_{LS}$ and $N_{m2} \leq 0.95 N_{LS}$.

30. A method according to claim 27, wherein the material with the higher refractive index substantially comprises at least an oxide or oxynitride.

31. A method according to claim 27, wherein the material with the lower refractive index comprises at least one of the following materials:

$TiO_2$, $Ta_2O_5$, $Nb_2O_5$, $HfO_2$, $ZrO_2$, $SiO_xN_y$, and the material with the lower refractive index comprises predominantly $SiO_2$ and $TiO_2$, with a ratio of the fractions of $A_{SiO2}=(60\pm5)\%$ and $A_{TiO2}=(100\%-A_{SiO2})$.

32. A method according to claim 27, wherein the material with the lower refractive index comprises $Y_2O_3$.

33. A method according to claim 27, wherein the refractive index $N_k$ of the material of the at least one base body is: $N_k=1.45\pm2\%$.

34. A method according to claim 27, wherein both coating systems are implemented like said at least one coating system.

35. A method according to claim 27, wherein the device is implemented as an X-cube in which the coating systems are substantially embedded along diagonal planes of a base body cuboid, which is at least approximately, square considered in a cutting plane perpendicular to the common line of intersection of the coating systems.

36. A method according to claim 11, including at least one emergent face for the light reflected on at least one of the coating systems and resulting from the splitting, is disposed tilted with respect to the direction of emergence of this light such that its face normal forms with said direction an angle $\phi$ deviating from zero and specifically by more than is caused by fabrication tolerances of the light splitter, for which: $\phi \leq 5°$.

37. A method according to claim 11, wherein the device is implemented as an X-cube.

38. A method according to claim 11, including, adjacent said output surfaces, reflectors for respective of said output light, which reflectors change polarity of reflected light and wherein light output from respective ones of said output surfaces is reflected at an adjacent surface of respective ones of said reflectors under an angle which deviates more from 0° than caused by manufacturing tolerances of the device, and wherein each of the reflectors is formed by configurations of reflecting light valves.

39. A method according to claim 38, wherein the light is reflected on the reflectors at an angle $\phi$ wherein: $0° < \phi \leq 5°$, with the angle deviating from zero by more than is caused by fabrication tolerances.

40. A method according to claim 38, wherein the light reflection at the specified angle takes place on more than one of the reflectors.

41. A method according to claim 38, wherein an incident face of the light splitter for the light to be divided comprises one of a polarization beam splitter and an HMI lamp as the illumination source for the incident face.

* * * * *